United States Patent [19]
Katano et al.

[11] Patent Number: 5,732,296
[45] Date of Patent: Mar. 24, 1998

[54] INDICATOR DEVICE FOR CAMERA

[75] Inventors: Yuji Katano; Hiroshi Wakabayashi, both of Kanagawa; Hitoshi Aoki, Tokyo, all of Japan

[73] Assignee: Nikon Corporation, Tokyo, Japan

[21] Appl. No.: 826,771

[22] Filed: Apr. 7, 1997

Related U.S. Application Data

[63] Continuation of Ser. No. 438,247, May 10, 1995, abandoned, which is a continuation of Ser. No. 161,084, Dec. 3, 1993, abandoned, which is a continuation of Ser. No. 920,674, Jul. 28, 1992, abandoned.

Foreign Application Priority Data

Jul. 31, 1991 [JP] Japan ..................... 3-214613

[51] Int. Cl.⁶ ..................... G03B 17/00; G03B 7/00
[52] U.S. Cl. ..................... 396/281; 396/296
[58] Field of Search ..................... 396/70, 147, 201, 396/239, 281, 296

[56] References Cited

U.S. PATENT DOCUMENTS

| | | | |
|---|---|---|---|
| 2,351,978 | 6/1944 | Kuppenbender | 354/470 |
| 2,992,600 | 7/1961 | Rentschler | 354/469 X |
| 4,118,726 | 10/1978 | Kuramoto et al. | 354/289.1 |
| 4,168,898 | 9/1979 | Orban | 354/289.1 |
| 4,230,402 | 10/1980 | Uchiyama et al. | 354/289.12 |
| 4,687,308 | 8/1987 | Somoya | 354/82 |
| 4,707,101 | 11/1987 | Akabano et al. | 354/289.12 |
| 4,837,596 | 6/1989 | Kawamura | 354/289.1 |
| 4,933,697 | 6/1990 | Kawamora et al. | 354/289.1 |
| 5,005,033 | 4/1991 | Miyasaka | 354/289.1 |
| 5,128,704 | 7/1992 | Hayashi et al. | 354/289.1 |
| 5,148,201 | 9/1992 | Umetsu et al. | 354/195.1 |
| 5,210,569 | 5/1993 | Harada | 354/289.1 |
| 5,223,888 | 6/1993 | Fukahori | 354/289.12 |
| 5,280,320 | 1/1994 | Kobayashi et al. | 354/471 |
| 5,363,169 | 11/1994 | Ishida et al. | 354/442 |

*Primary Examiner*—Safet Metjahic
*Assistant Examiner*—Nicholas J. Tuccillo
*Attorney, Agent, or Firm*—Oliff & Berridge, PLC

[57] ABSTRACT

An indicator device comprises an indicator rotatively driven by an electrical driving source, such as a stepping motor or the like, a plurality of indexes indicated by the indicator to indicate various photographing information, and changing mechanism for changing indicating positions of the indicator. The changing mechanism includes an operating member operated in order to start a rotation of the indicator, an operating member for commanding a rotational direction of said indicator, and driving control mechanism for controlling a rotation of the indicator in accordance with operation of the operating members.

34 Claims, 10 Drawing Sheets

INDICATOR DEVICE FOR CAMERA

This is a Continuation of application Ser. No. 08/438,247 filed May 10, 1995 now abandoned, which in turn is a continuation of application Ser. No. 08/161,084 filed Dec. 3, 1993, abandoned, which in turn is a continuation of application Ser. No. 07/920,674 filed Jul. 28, 1992, abandoned.

BACKGROUND OF THE INVENTION

1. Field of the Invention

The present invention relates to an indicator device for a camera, for indicating various photographing information.

2. Related Background Art

As a device for displaying various photographing information on a camera, a liquid-crystal display device has conventionally been known which digitally displays shutter speed and the like and symbolically displays a self-timer mode and the like. An arrangement has also been known in which a rotational dial for setting various photographing conditions, such as a shutter speed, a stop value and the like, is provided to both set and indicate the photographing conditions.

However, if the liquid-crystal display device or the rotational dial is mounted on the limited area of an upper surface and a rear surface of the camera, letters or characters on the liquid-crystal display or the rotational dial must be reduced in size. Therefore, there occurs a problem that various photographing information including the photographing conditions is difficult to be seen.

SUMMARY OF THE INVENTION

It is an object of the present invention to provide an indicator device for a camera, in which a limited space of a camera is effectively utilized to indicate various photographing information so as to be easy to be seen.

In order to achive the above-noted object of the present invention, an indicator device for a camera, for indicating various photographing information according to the present invention comprises an indicator rotatively driven by an electrical driving source, indexes indicated by the indicator to indicate the various photographing information, and changing means for changing indicating positions of the indicator.

With the above arrangement of the present invention, respective indexes are indicated by the rotating indicator to indicate various photographing information, whereby it is possible for a user of a camera to realize the photographing information set in the camera. The indicating positions of the indicator is changed by the changing means such as, for example, operation button.

According to the present invention, by reading out the indexes including numeral letters, symbols or signs indicated by the rotative indicator, the various photographing information set at present can be realized. Accordingly, it is possible to apply relatively large sized numeral letters, characters, symbols and the like on a limited space of the camera. Thus, it is possible to provide an indicator device which is easy to be seen at a low cost.

DETAILED DESCRIPTION OF THE PREFERRED EMBODIMENTS

First Embodiment

A first embodiment of the present invention will be described with reference to FIGS. 1-3.

Figure 2:
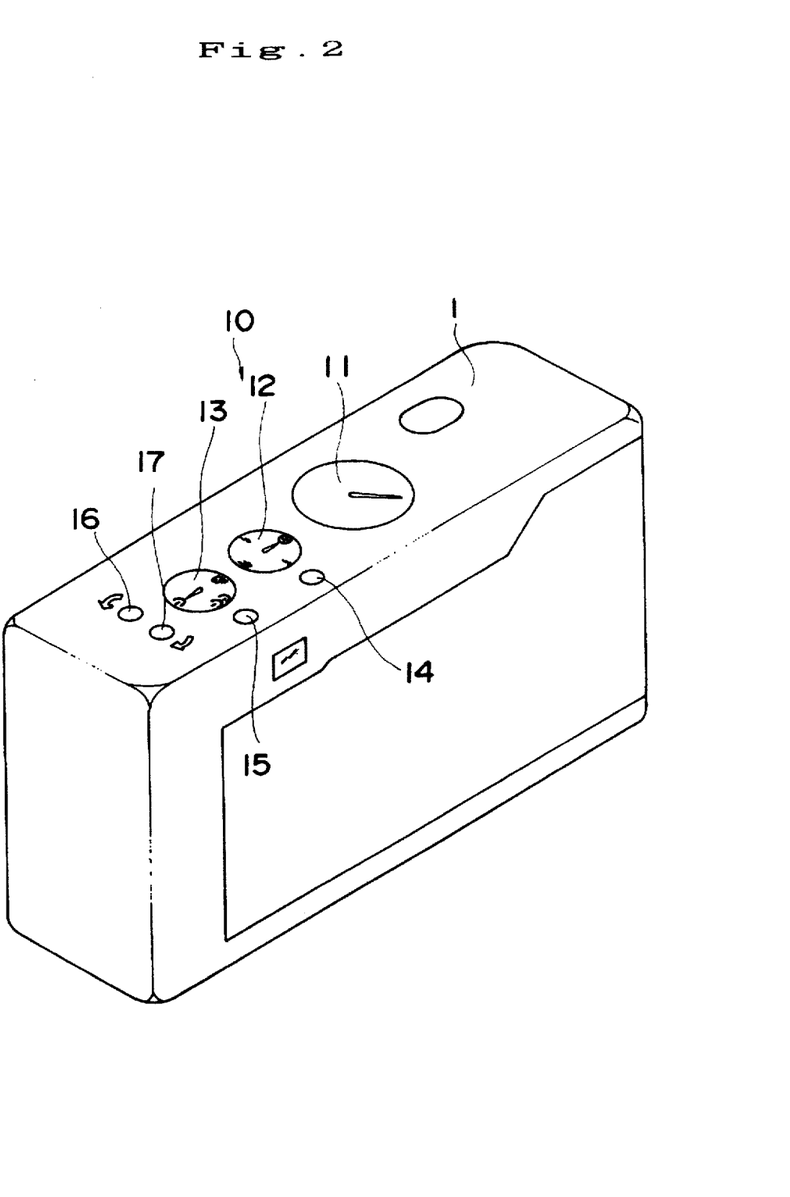
FIG. 2 is a perspective view showing a camera as viewed from a rear surface thereof, to which the present invention is applied.

FIG. 2 is a view showing a camera provided with an indicator device according to an embodiment of the present invention, as viewed from a rear surface of the camera. The indicator device 10 is arranged on an upper surface of a camera body 1. The indicator device 10 comprises a frame number indicator unit 11, a flash-mode indicator unit 12, a self-timer mode indicator unit 13, and a plurality of buttons 14–17 for changing respective indicating positions of the flash-mode indicator unit 12 and the self-timer mode indicator unit 13.

Figure 1:
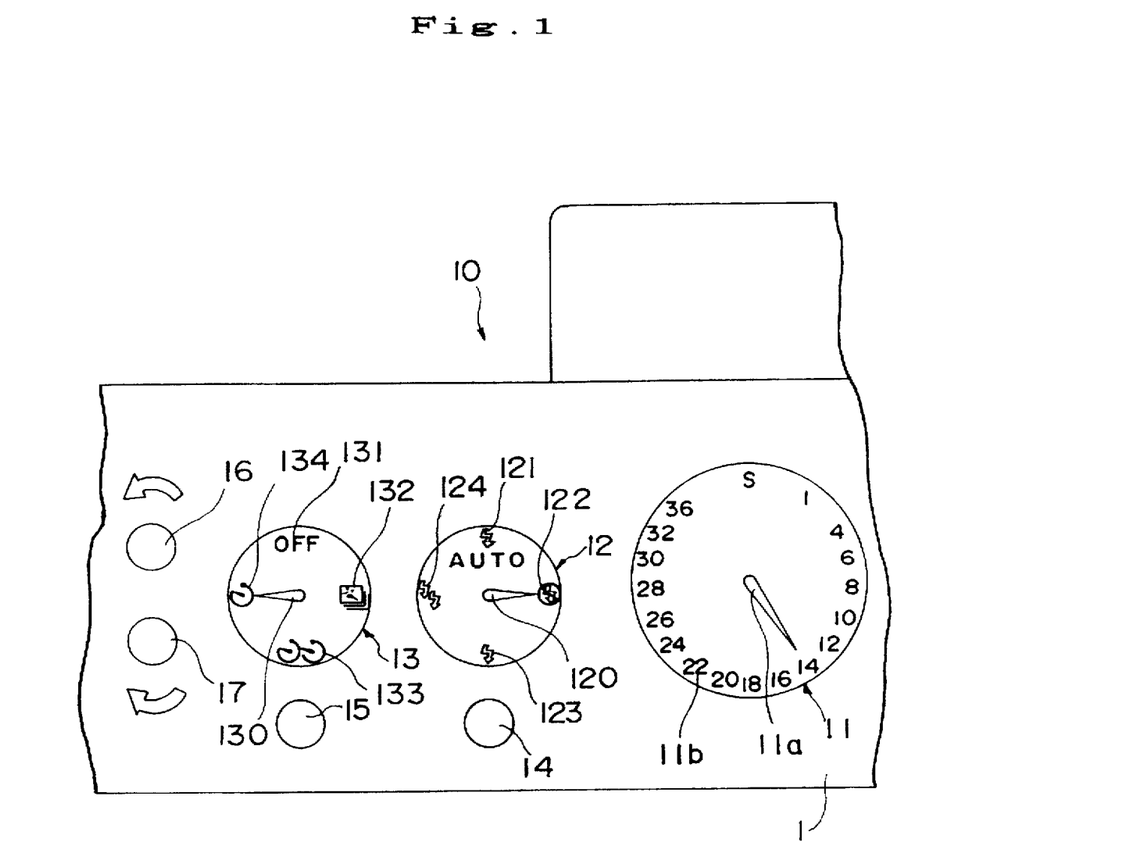
FIG. 1 is a top plan view showing, in enlargement, an indicator unit according to a first embodiment of the present invention.

FIG. 1 is a view showing, in enlargement, the upper surface of the camera illustrated in FIG. 2. The frame number indicator unit 11 has an indicator 11a and a frame number indexes 11b for indicating the number of photographed frames by the indicator 11a. The indicator 11a is rotatably driven by a step motor 51 illustrated in FIG. 3 in synchronism with film feed. The frame number indexes 11b consists of letters of [1]–[36] and [S]. When a film cartridge is newly loaded into the camera and then idle-fed, the indicator 11a is rotated by the step motor 51 from the position [S] to [1] of the frame number indexes 11b. When photographing of the first frame is completed or finished, the indicator 11a is clockwise rotated only by one step corresponding to one frame, and indicates [2]. When the film cartridge is unloded from the camera, the indicator 11a is rotated by the step motor 51 to indicate [S]. Such control of a rotational amount of the indicator 11a is executed by a control circuit 50 illustrated in FIG. 3.

The flash-mode indicator unit 12 comprises an indicator 120 and a plurality of flash-mode indexes 121–124 for indicating one of the flash-modes by the indicator 120, respectively. The indicator 120 is rotatively driven by a step motor 52 illustrated in FIG. 3. The flash-mode index 121 consists of both an English letter [AUTO] and a symbol indicating that flash is automatically executed; the flash-mode index 122, a symbol indicating that flash is inhibited; the flash-mode index 123, a symbol indicating that flash is forcibly carried out; and the flash-mode 124, a symbol indicating that a pre-flash is carried out prior to a main-flash so that so-called red-eye reduction can be obtainable. In FIG. 1, the indicator 120 indicates flash inhibition mode.

The self-timer mode indicator unit 13 has an indicator 130, and a plurality of self-timer mode indexes 131-134 for indicating one of the self-timer modes by the indicator 130, respectively. The indicator 130 is rotatively driven by a step motor 53 illustrated in FIG. 3. The self-timer mode index 131 is an English letter [OFF] indicating that the self-timer mode is not used or the self-timer mode is cancelled; the self-timer mode index 132, a symbol indicating that continuous photographing is executed in the self-timer mode; the self-timer mode index 133, a symbol indicating a two-shot self-timer mode in which photographing is executed twice in the self-timer mode; and the self-timer mode index 134, a symbol indicating a one-shot self-timer mode in which one photographing is executed. In FIG. 1, the indicator 130 indicates the one-shot self-timer mode.

The flash-mode feed button 14 is arranged adjacent to the flash-mode indicator unit 12. Operation of the button 14 causes the indicator 120 to rotate. The self-timer mode feed button 15 is arranged adjacent to the self-timer mode indicator unit 13. Operation of the button 15 causes the indicator 130 to rotate. Rotational directions of the respective indicators 120 and 130 are prescribed by the rotational-direction setting buttons 16 and 17, respectively. When the flash-mode feed button 14 or the self-timer mode feed button 15 is operated while operating the button 16, the indicator 120 or 130 is counterclockwise rotated. When the flash-mode feed button 14 or the self-timer mode feed button 15 is operated while operating the button 17, the corresponding indicator 120 or 130 is clockwise rotated. Such control of the indicator rotational directions is also executed by the control circuit 50 illustrated in FIG. 3.

Figure 3:
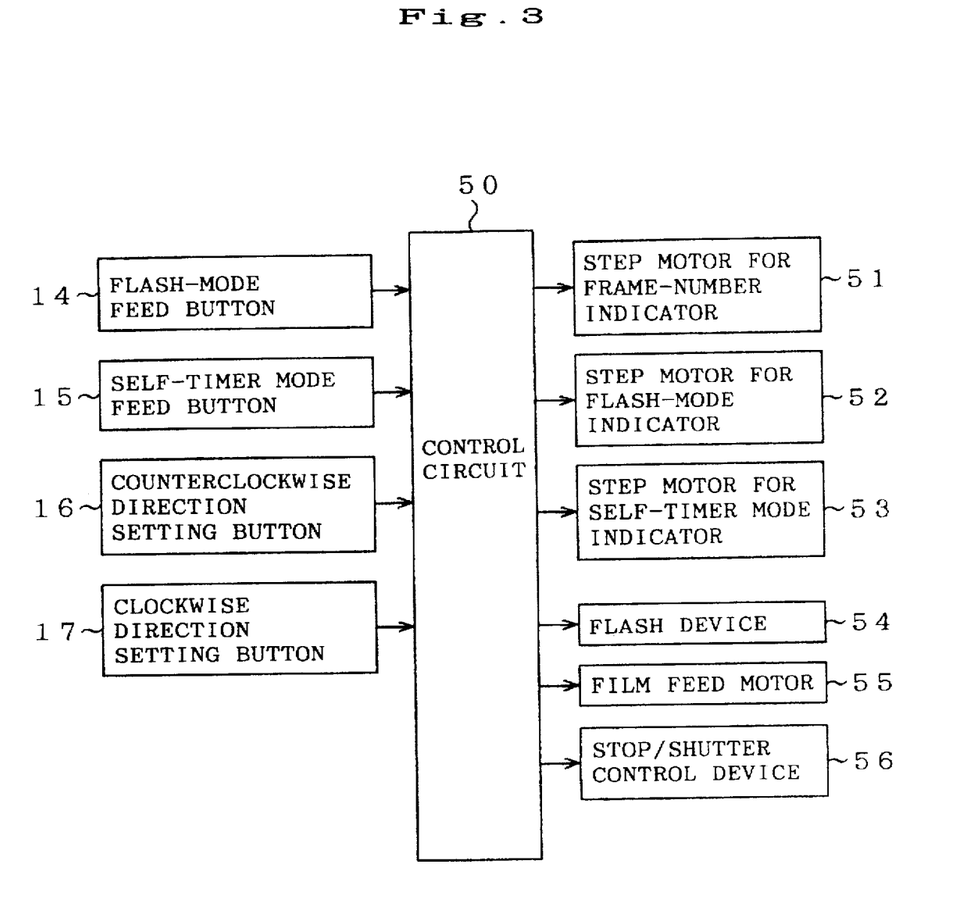
FIG. 3 is a block diagram showing a drive control circuit of the indicator unit.
Figure 4:
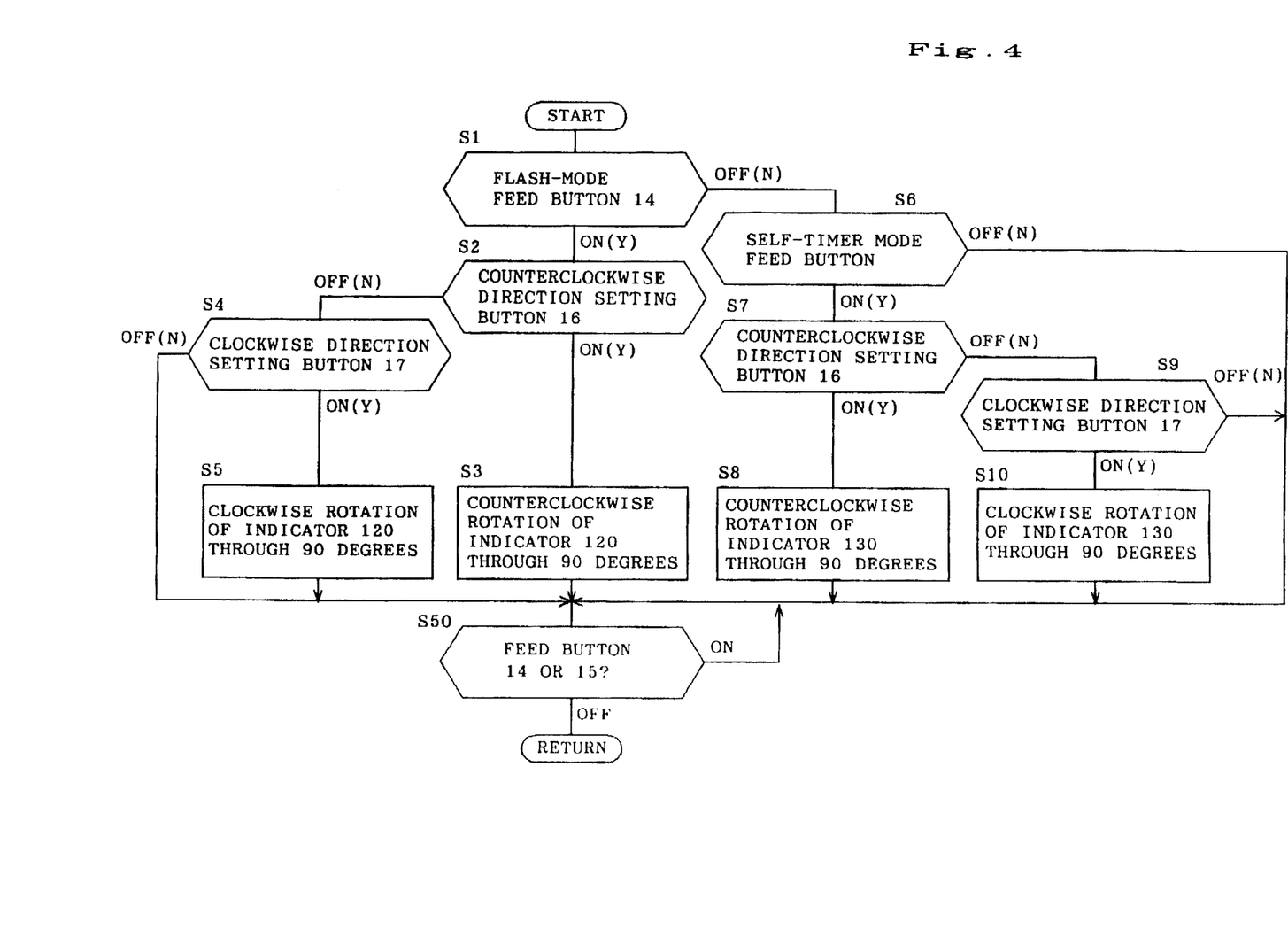
FIG. 4 is a flow chart showing an indicator driving processing procedure of the first embodiment.

FIG. 3 is a block diagram showing a drive control circuit for the indicator driving step motors 51-53 and the like, while FIG. 4 is a flow chart showing an example of processing procedure for indicator driving executed by the control circuit 50.

As shown in FIG. 3, the indicator driving step motors 51-53 are connected to the control circuit 50 having such as CPU, ROM, RAM for example. Connected also to the CPU 50 are the flash-mode feed button 14, the self-timer mode feed button 15, and the rotational-direction setting buttons 16 and 17. Connected also to the control circuit 50 are a flash device 54, a film feed motor 55, a control device 56 for a stop and a shutter.

The example of the indicator driving procedure in the present embodiment will be described with reference to FIG. 4.

A program illustrated in FIG. 4 starts by operation of any one of various buttons 14-17. First, in a step S1, it is judged whether or not the flash-mode feed button 14 is operated. If it is judged that the flash-mode feed button 14 is operated, a program proceeds to a step S2. In the step S2, it is judged whether or not the counterclockwise direction setting button 16 is operated. If the counterclockwise direction setting button 16 is operated, the program proceeds to a step S3 where the step motor 51 is reversely rotated to rotate the indicator 120 in the counterclockwise direction through 90 degrees. If the counterclockwise direction setting button 16 is not operated, the step S2 is denied, and the program proceeds to a step S4. In the step S4, it is judged whether or not the clockwise direction setting button 17 is operated. If it is judged that the clockwise direction setting button 17 is operated, the step motor 51 is rotated normally in a step S5 so that the indicator 120 is rotated through 90 degrees in the clockwise direction.

If the step S1 is denied, the program proceeds to a step S6. In the step S6, it is judged whether or not the self-timer mode feed button 15 is operated. By the affirmative judgment in the step S6, the program proceeds to a step S7. In the step S7, if operation of the counterclockwise direction setting button 16 is judged, the indicator 130 is rotated through 90 degrees in the counterclockwise direction in a step S8. In a step S9, if operation of the clockwise direction setting button 17 is judged, the program proceeds to a step S10 where the indicator 130 is rotated through 90 degrees in the clockwise direction. In a step S50, the program waits until operation of the flash-mode feed button 14 or the self-timer mode feed button 15 is stopped. If operation of the button 14 or 15 is not judged, the program is returned.

Second Embodiment

Figure 5:
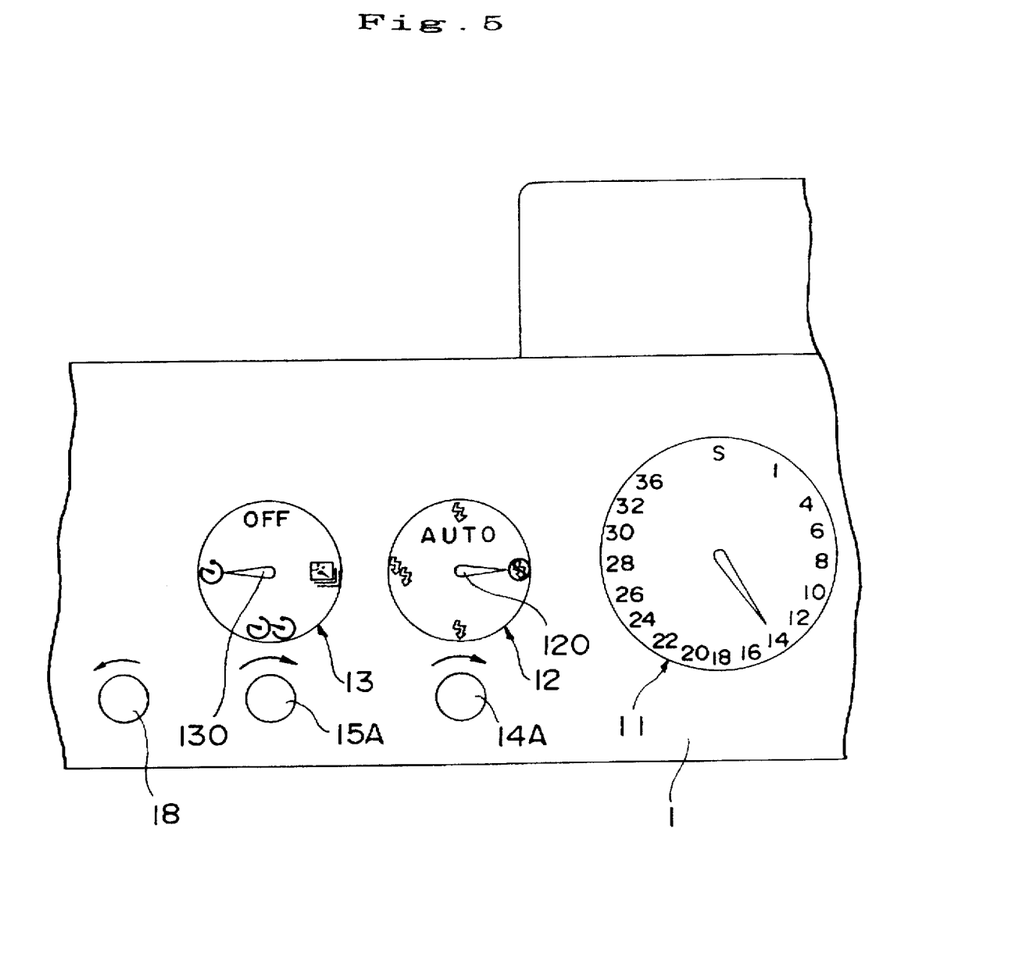
FIG. 5 is a top plan view showing, in enlargement, an indicator according to a second embodiment of the present invention.

FIG. 5 shows an indicator device according to a second embodiment of the present invention. In the indicator device, only a counterclockwise direction setting button 18 is provided in place of the buttons 16 and 17 which set the respective rotational directions of indicators 120 and 130 in FIG. 1, and a clockwise rotational direction is normally set. When only a flash-mode feed button 14A or a self-timer mode feed button 15A is operated, the corresponding indicator 120 or 130 is rotated in clockwise direction. When both the flash-mode feed button 14A or the self-timer mode feed button 15A and the counterclockwise direction setting button 18 are operated, the corresponding indicator 120 or 130 is rotated in the counterclockwise direction.

Figure 6:
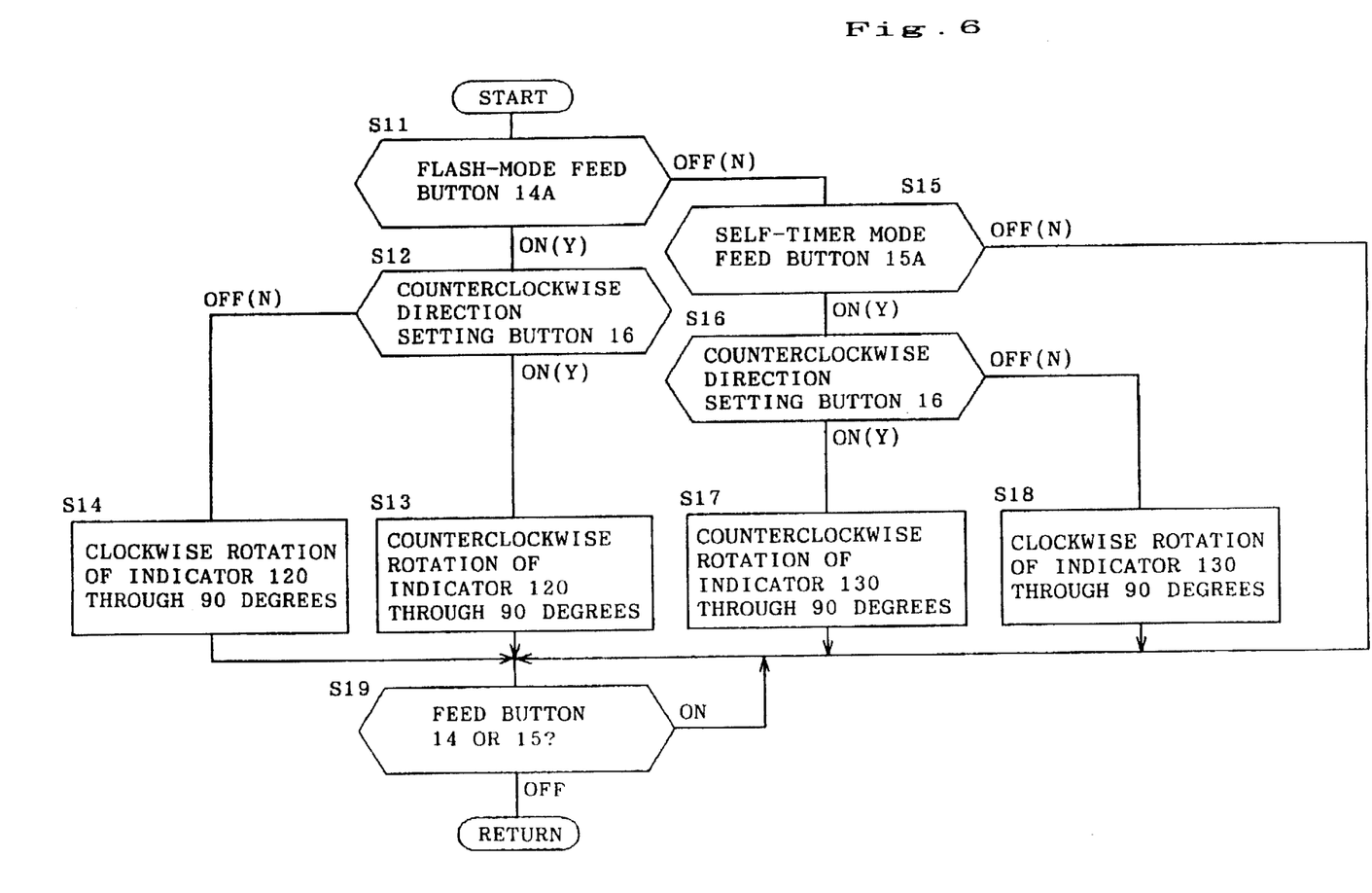
FIG. 6 is a flow chart showing an indicator driving processing procedure of the second embodiment.

FIG. 6 is a flow chart showing an example of indicator driving procedure corresponding to the indicator device in FIG. 5.

When only the flash-mode feed button 14A is operated, a step 11 is affirmed and a step S12 is denied so that a program proceeds to a step S14. In the step S14, the indicator 120 is rotated through 90 degrees in the clockwise direction. When both the flash-mode feed button 14A and the counterclockwise direction setting button 18 are operated, both the step S11 and the step S12 are affirmed so that the program proceeds to a step S13. In the step 13, the indicator 120 is rotated through 90 degrees in the counterclockwise direction. The indicator driving procedure of the self-timer mode indicator unit 13 is similar to the above, and the description thereof will be omitted.

In the first and second embodiments described above, since the rotational direction of the indicator can be selected, the indicating position of the indicator can be changed rapidly. In addition, a clock unit available commercially can be used as an indicator unit, and a control system and a power source can be arranged in the camera body, whereby an entire system can be simplified.

Third Embodiment

Figure 7:
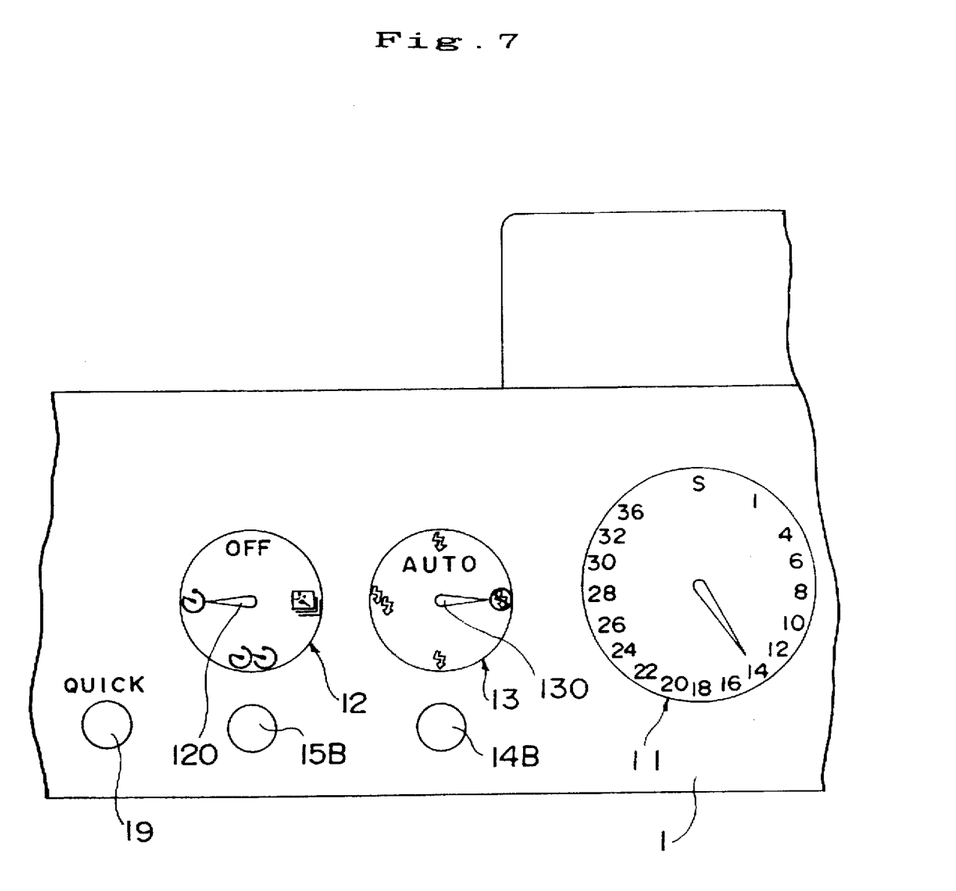
FIG. 7 is a top plan view showing, in enlargement, an indicator according to a third embodiment of the present invention.

FIG. 7 shows a third embodiment of the present invention. Points different from the first and second embodiments will chiefly be described. In the third embodiment, the indicator rotational-direction setting buttons 16, 17 and 18 are omitted, and indicators 120 and 130 in FIG. 7 are normally rotated in the clockwise direction.

When a flash-mode feed buttom 14B or a self-timer mode feed button 15B is operated, the corresponding indicator 120 or 130 is clockwise rotated every 90 degrees. The reference numeral 19 denotes a quick button. When the flash-mode feed button 14B and the self-timer mode feed button 15B are operated while the quick button 19 is depressed, the corresponding indicator 120 or 130 is clockwise rotated at a high speed.

Figure 8:
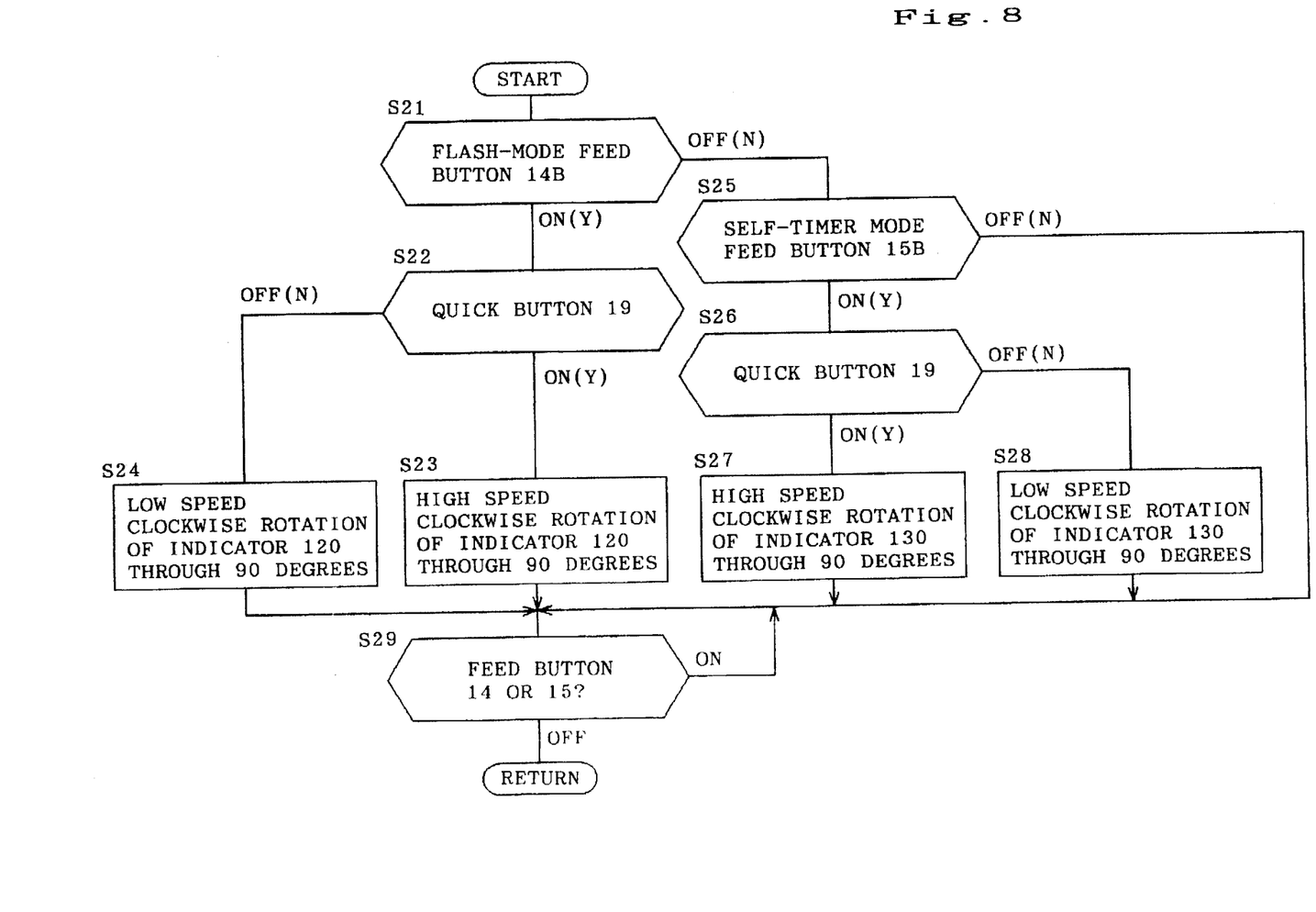
FIG. 8 is a flow chart showing an indicator driving processing procedure of the third embodiment.

FIG. 8 is a flow chart showing a procedure of the third embodiment of the present invention.

In a case where only the flash-mode feed button 14B is operated, a step S21 is affirmed and a step S22 is denied so that a program proceeds to a step S24 where the indicator 120 is rotatively driven at a low speed. When the flash-mode feed button 14B is operated while the quick button 19 is depressed, the program proceeds to the step S23 from the step S21 through the step S22, where the indicator 120 is rotated at a high speed in the clockwise direction. The indicator driving procedure of the self-timer mode indicator unit 13 is entirely similarly to those of the flash-mode indicator unit 12. When the quick button 19 and the self-timer mode feed button 15B are simultaneously operated, the indicator 130 is rotated at a high speed in the clockwise direction in a step S27. When only the self-timer mode feed button 15B is operated, the indicator 130 is rotated in a step S28 at a low speed in the clockwise direction.

In the third embodiment, since a high-speed driving mode for rotating of the indicator is provided, quick indicator change is made possible similarly to the first and second embodiments.

Such high-speed driving of the indicator can be accomplished by inputting a driving pulse having a high frequency to the step motors 52 and 53.

Fourth Embodiment

Figure 9:
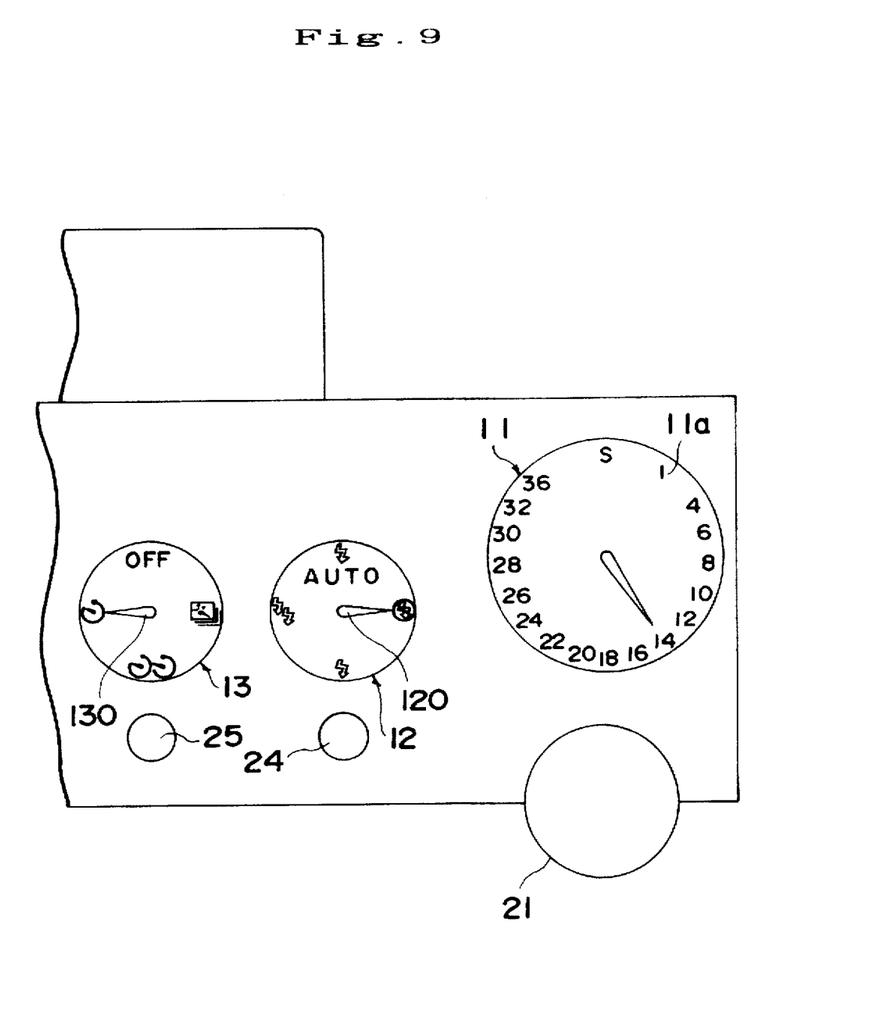
FIG. 9 is a top plan view showing, in enlargement, an indicator according to a fourth embodiment of the present invention.

A fourth embodiment of the present invention will be described with reference to FIGS. 9 and 10.

A flash-mode indicator selection button 24 and a self-timer mode indicator selection button 25 are used to select any one of indicator units 12 and 13. Only operation of each of the buttons 24 and 25 does not cause an indicator 120 or 130 in FIG. 9 to be rotated. In this embodiment, when the indicator unit 12 or 13 is selected by the corresponding button 24 or 25 and a rotational dial 21 is rotatively operated equal to or more than a predetermined amount in a clockwise direction, the indicator of the selected indicator unit is rotated through 90 degrees in the clockwise direction. When the rotational dial 21 is rotatively operated equal to or more than a predetermined amount in the counterclockwise direction, the indicator of the selected indicator unit is rotated through 90 degrees in the counterclockwise direction. In this connection, the rotational dial 21 is connected to a well-known two-phase type switch. When the switch is rotated through a predetermined amount, a pulse train having an A-phase and a pulse train having B-phase are generated, respectively. The phase of the two pulse trains depends upon the rotational direction of the dial 21. Accordingly, the rotational direction can be judged based on depending upon the phase of the two pulse trains.

Figure 10:
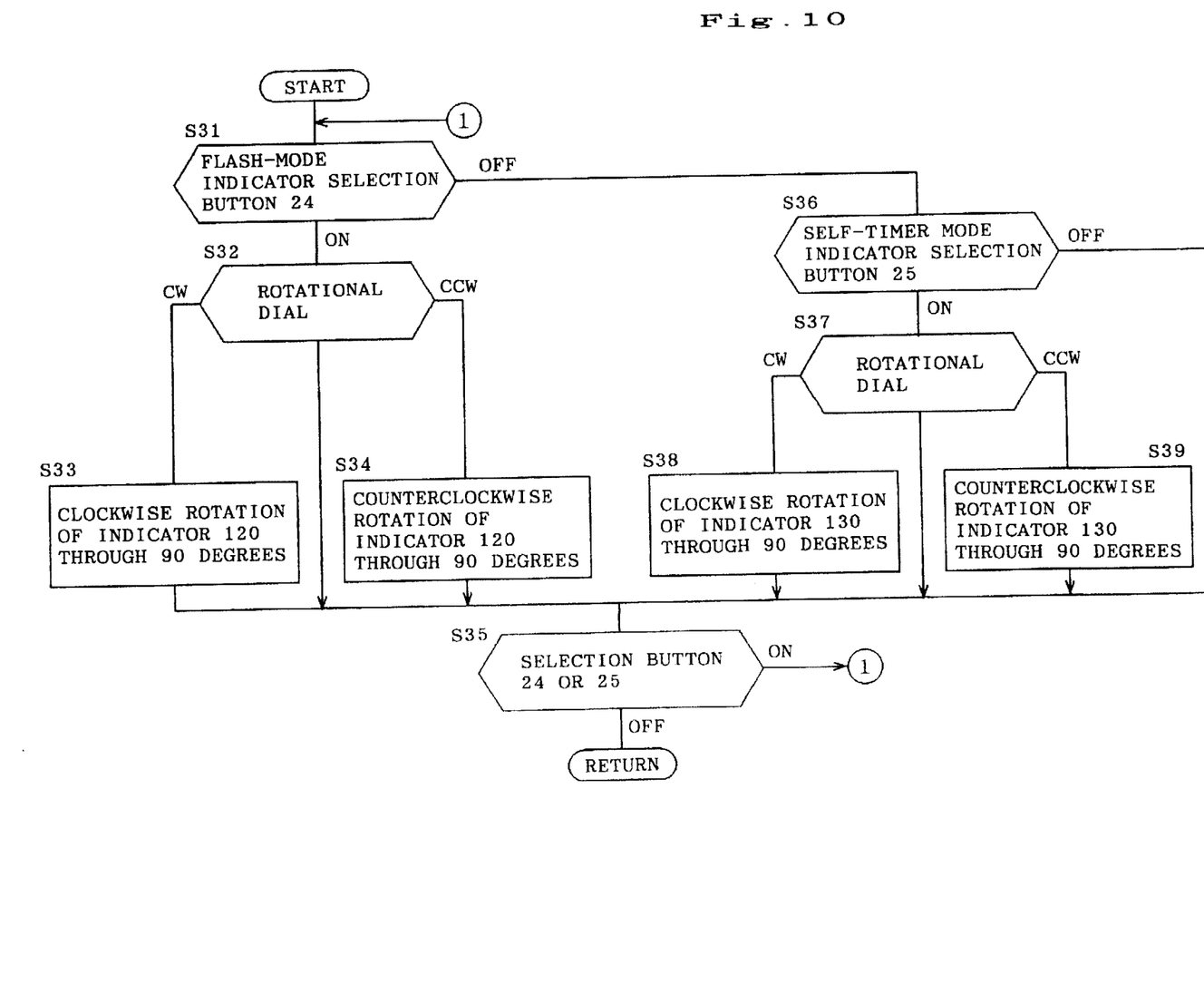
FIG. 10 is a flow chart showing an indicator driving processing procedure of the fourth embodiment.

FIG. 10 is a flow chart showing an indicator driving procedure in the fourth embodiment of the present invention.

If it is judged in a step S31 that the flash-mode indicator selection button 24 is operated, an operating direction and an amount of operation of the rotational dial 21 are judged in a step S32. In the step S32, if it is judged that the rotational dial 21 is rotated in the clockwise direction equal to or more than the predetermined amount, the indicator 120 is driven through 90 degrees in the clockwise direction in a step S33.

On the other hand, if it is judged in the step S32 that the rotational dial 21 is operated equal to or more than the predetermined amount in the counterclockwise direction, the indicator 120 is driven through 90 degrees in the counterclockwise direction. When the rotational dial 21 is not operated equal to or more than the predetermined amount, the indicator 120 is not driven, and the program proceeds to a step S35. When it is judged that the self-timer mode indicator selection button 25 is operated in a step S36, the rotation of the indicator 130 is similarly controlled in accordance with the rotational direction and the operational amount of the rotational dial 21.

If the rotational dial 21 is not operated equal to or more than the predetermined amount, the program proceeds to the step S35. In the step S35, it is judged whether or not the flash-mode indicator selection button 24 or the self-mode indicator selection button 25 is operated. If the flash-mode indicator selection button 24 or the self-timer mode indicator selection button 25 is not operated, the program is returned.

In connection with the above, photographing conditions and photographing information indicated by the indicators should not be limited to those described previously, but may be a clock of data back, an exposure correction value, a stop value, a shutter speed, a photographing distance and the like. Moreover, although the above-described arrangement is such that the three indicators are driven respectively by the stepping motors separate from each other, in case that a plurality of indicators are not driven simultaneously, a single step motor can be used to drive these indicators. Furthermore, although the indicator units are arranged on the upper surface of the camera as described above, the positions of the respective indicator units should not be limited to the upper surface, but may be arranged on the rear surface of the camera, for example. Each of the motors should not be limited to the step motor, but may be a D.C. micro motor.

What is claimed is:

1. An indicator device for a camera, for indicating various photographing information, comprising:

a body having a display surface;

an indicator positioned on said display surface of said body and having a rotatable indicator display element that rotates about an axis;

indexes indicated by said indicator to indicate said various photographing information;

a manually rotational operable dial rotatively operated about an axis of rotation that is generally perpendicular to said display surface and generally parallel to the axis of rotation of the indicator display element; and a controller that controls an indicating position of said indicator display element when said manually operable rotational dial is operated, wherein said indicator display element rotates in correspondence with rotation of said manually operable rotational dial.

2. An indicator device according to claim 1, wherein said indicator display element is so arranged as to be capable of being rotated normally and reversely.

3. An indicator device according to claim 1, wherein said rotatable indicator display element is a pointer that is mechanically driven.

4. An indicator device according to claim 3, further comprising:

a motor for driving said pointer, and wherein said controller controls said motor to change the indicating position of said pointer.

5. An indicator device according to claim 1, wherein said controller further includes:

a manually operable normal-rotation command operating member operated in order to normally rotate said indicator display element;

a manually operable reverse-rotation command operating member operated in order to reversely rotate said indicator display element; and a driving controller that drives said indicator display element in normal rotation when said normal-rotation command operating member is operated, and that drives said indicator display element in reverse rotation when said reverse rotation command operating member is operated.

6. An indicator device according to claim 5, wherein said indicator device includes a first and a second indicator units each having said indicator and said indexes, said first indicator unit indicating one of modes regarding a flash, and said second indicator unit indicating one of modes regarding a self-timer.

7. An indicator device according to claim 6, wherein said first indicator unit indicates any one of a forcible flash mode for forcibly flashing at release, a flash inhibiting mode for inhibiting flash at release, a red-eye reduction flash mode for pre-flashing for reduction of red-eye prior to a main-flashing, and an automatic flash mode for automatically flashing at release depending on a brightness of an object, and wherein said second indicator unit indicates any one of a one-shot self-timer mode in which only one frame is photographed after a predetermined period of time from release operation, a two-shot self-timer mode in which two frames are photographed at a predetermined time interval from the release operation, a continuous photographing self-timer mode in which photographing is executed continuously after a predetermined period of time from the release operation, and a cancel mode in which said self-timer modes are canceled.

8. An indicator device according to claim 1, further comprising a manually operable command operating member operated to enable rotation of said indicator display element, wherein said controller rotates said indicator display element through only one pitch in one direction when both of an operation of said manually operable command operating member and a normal rotation of said manually operable rotational dial only through a predetermined amount are carried out, and rotates said indicator display element through only one pitch in another direction when both of an operation of said manually operable command operating member and a reverse rotation of said manually operable rotational dial through a predetermined amount are carried out.

9. An indicator device according to claim 8, wherein said indicator device includes a first and a second indicator units each having said indicator and said indexes, said first indicator unit indicating one of modes regarding flash, and said second indicator unit indicating one of modes regarding a self-timer.

10. An indicator device according to claim 8, wherein said first indicator unit indicates any one of a forcible flash mode for forcibly flashing at release, a flash inhibiting mode for inhibiting flashing at release, a red-eye reduction flash mode for pre-flashing for reduction of red-eye prior to a main-flashing, and an automatic flash mode for automatically flashing at release depending on brightness of an object, and wherein said second indicator unit indicates any one of a one-shot self-timer mode in which only one frame is photographed after a predetermined period of time from the release operation, a two-shot self-timer mode in which only two frames are photographed at a predetermined time interval from the release operation, a continuous photographing self-timer mode in which photographing is executed continuously after a predetermined period of time from the release operation, and a cancel mode in which said self-timer modes are canceled.

11. An indicator device for a camera according to claim 8, wherein said indicator and said manually operable command operating member are arranged on a same surface of a body of said camera.

12. An indicator device for indicating various information, comprising:

a body having a display surface;

an indicator positioned on said display surface of said body and having a rotatable indicator display element that rotates about an axis;

indexes indicated by said indicator display element to indicate said various information;

a manually operable rotational dial rotatively operated about an axis of rotation that is generally perpendicular to said display surface and generally parallel to the axis of rotation of said indicator display element; and a controller that controls an indicating position of said indicator display element when said manually operable rotational dial is operated, wherein said indicator display element rotates in correspondence with rotation of said manually operable rotational dial.

13. An indicator device according to claim 12, further comprising a manually operable command operating member operated to enable rotation of said indicator display element, wherein said indicator and said manually operable command operating member are arranged on a same surface of a body equipped with said indicator device.

14. An indicator device according to claim 12, wherein said rotatable indicator display element is a pointer that is mechanically driven.

15. An indicator device according to claim 14, further comprising:

a motor for driving said pointer, and wherein said controller controls said motor to change the indicating position of said pointer.

16. An indicator device for a camera, for indicating various photographing information, comprising:

a body having a display surface;

an indicator positioned on said display surface of said body and having a rotatable indicator display element that rotates about an axis;

indexes indicated by said indicator display element to indicate said various photographing information;

a manually operable rotational dial rotatively operated about an axis of rotation that is generally perpendicular to said display surface and generally parallel to the axis of rotation of said indicator display element; and a changing control device electrically connected to said manually operable rotational dial, which controls the rotation of said rotatable indicator display element based on rotation of said manually operable rotational dial.

17. An indicator device for a camera according to claim 16, further comprising a manually operable command operating member operated to enable rotation of said indicator display element, wherein said manually operable command operating member and said indicator are arranged on a same surface of a body of said camera.

18. An indicator device according to claim 16, wherein an axis around which said indicator display element rotates is parallel to an axis around which said manually operable rotational dial rotates.

19. An indicator device according to claim 16, wherein said changing device rotates said indicator display element in a same rotational direction with a rotational direction of said manually operable rotational dial.

20. An indicator device according to claim 19, wherein said manually operable rotational dial and said indicator display element are capable of rotating in a clockwise direction and in a counterclockwise direction, said manually operable rotational dial generates a rotational signal including an information of a rotational direction of said manually operable rotational dial and said changing device rotates said indicator display element in the rotational direction based on said information.

21. An indicator device according to claim 16, wherein said rotatable indicator display element is a pointer that is mechanically driven.

22. An indicator device according to claim 21, further comprising:

a motor for driving said pointer, and wherein said changing control device controls said motor to change the indicating position of said pointer.

23. An indicator device for indicating various information, comprising:

a body having a display surface;

first and second indicators positioned on said display surface of said body, each having a rotatable indicator display element that rotates about an axis;

first and second indexes each indicated by any one of said first and second indicators to indicate one of said various information;

a position changing device manually rotated about an axis of rotation that is generally perpendicular to said display surface in order to change an indicating position of a selected indicator; and a changing control device electrically connected to said position changing device, which controls the rotation of said first rotatable indicator display element to change an indicating position of said first indicator when said position changing device is operated, and which controls the rotation of said second rotatable indicator display element to change an indicating position of said second indicator in correspondence with rotation of said position changing device.

24. An indicator device according to claim 23, wherein said first and second rotatable indicator display elements are respectively first and second pointers that are mechanically driven.

25. An indicator device according to claim 24, further comprising:

first and second motors for driving said first and second pointers respectively, and wherein said changing control device controls said first motor to control the rotation of said first pointer, and controls said second motor to control the rotation of said second pointer.

26. An indicator device for a camera, for indicating various photographing information, comprising:

a body having a display surface;

first and second indicators positioned on said display surface of said body, each having a rotatable indicator display element that rotates about an axis;

first and second indexes each indicated by any one of said first and second indicators to indicate one of said various photographing information;

first and second operating members each operated to select one of said first and second indicators;

a position changing device manually rotated about an axis of rotation that is generally perpendicular to said display surface and generally parallel to the axis of rotation of said indicator display element in order to change an indicating position of said indicator selected by said first and second operating members; and a changing control device electrically connected to said position changing device, which controls the rotation of said first rotatable indicator display element to change an indicating position of said first indicator when said first operating member and said position changing device are operated simultaneously, and which controls the rotation of said second rotatable indicator display element to change an indicating position of said second indicator when said second operating member and said position changing device are operated simultaneously, wherein rotating said position changing device causes corresponding rotation of said indicator display element.

27. An indicator device according to claim 26, wherein said first and second rotatable indicator display elements are respectively first and second mechanical pointers.

28. An indicator device according to claim 27, further comprising:

first and second motors for driving said first and second pointers respectively, and wherein said changing control device controls said first motor to control the rotation of said first pointer, and controls said second motor to control the rotation of said second pointer.

29. An indicator device for a camera, for indicating various photographing information, comprising:

an indicator having a rotatable indicator display element;

indexes indicated by said indicator display element to indicate said various photographing information;

a manually operable command operating member operated in order to enable a rotation of said indicator display element;

a manually operable rotational-speed selective operation member operated in order to select a rotational speed of said indicator display element; and drive control means for rotatively driving said indicator display element at a first rotational speed when only said command operating member is operated, and for rotatively driving said indicator display element at a second rotational speed higher than said first rotational speed when both said rotational-speed selective operation member and said command operating member are operated simultaneously.

30. An indicator device according to claim 29, wherein said rotatable indicator display element is a pointer that is mechanically driven.

31. An indicator device according to claim 30, further comprising:

a motor for driving said pointer, and wherein said drive control means controls said motor to rotatively drive said pointer.

32. An indicator device for a camera, for indicating various photographing information, comprising:

an indicator having a rotatable indicator display element;

indexes indicated by said indicator display element to indicate said various photographing information;

a manually operable command operating member operated in order to enable a rotation of said indicator display element;

a manually operable rotational-speed selective operation member operated in order to select a rotational speed of said indicator display element; and a drive control device which rotatively drives said indicator display element at a first rotational speed when only said command operating member is operated, and rotatively drives said indicator display element at a second rotational speed higher than said first rotational speed when both said rotational-speed selective operation member and said command operating member are operated simultaneously.

33. An indicator device according to claim 32, wherein said rotatable indicator display element is a pointer that is mechanically driven.

34. An indicator device according to claim 33, further comprising:

a motor for driving said pointer, and wherein said drive control device controls said motor to rotatively drive said pointer.

* * * * *